(12) United States Patent
Britton et al.

(10) Patent No.: US 12,347,288 B2
(45) Date of Patent: Jul. 1, 2025

(54) SECURITY SYSTEM WITH DOORBELL, CAMERA AND IDENTIFICATION CAPABILITY

(71) Applicant: DIGITAL MONITORING PRODUCTS, INC., Springfield, MO (US)

(72) Inventors: Rick A. Britton, Springfield, MO (US); Jeffrey M. Britton, Springfield, MO (US); Brad Tucker, Springfield, MO (US)

(73) Assignee: Digital Monitoring Products, Inc., Springfield, MO (US)

( * ) Notice: Subject to any disclaimer, the term of this patent is extended or adjusted under 35 U.S.C. 154(b) by 0 days.

(21) Appl. No.: 15/944,723

(22) Filed: Apr. 3, 2018

(65) Prior Publication Data
US 2019/0304274 A1    Oct. 3, 2019

(51) Int. Cl.
| | | |
|---|---|---|
| *G08B 13/196* | (2006.01) | |
| *G07C 9/25* | (2020.01) | |
| *G08B 25/10* | (2006.01) | |
| *H04N 7/18* | (2006.01) | |
| *G06V 20/69* | (2022.01) | |
| *G06V 40/12* | (2022.01) | |

(Continued)

(52) U.S. Cl.
CPC ........ *G08B 13/19656* (2013.01); *G07C 9/25* (2020.01); *G08B 13/19695* (2013.01); *G08B 13/19697* (2013.01); *G08B 25/10* (2013.01); *H04N 7/186* (2013.01); *G06V 20/698* (2022.01); *G06V 40/1365* (2022.01); *G06V 40/172* (2022.01); *G06V 40/197* (2022.01)

(58) Field of Classification Search
CPC ........ G08B 13/19656; G08B 13/19695; G08B 13/19697; G08B 25/10; G08B 13/19669; G06K 9/00087; G06K 9/00147; G06K 9/00288; G06K 9/00617; G07C 9/25; G07C 2209/62; G07C 9/00571; G07C 9/00904; H04N 7/186; G06V 20/698; G06V 40/1365; G06V 40/172; G06V 40/197; G06V 20/52; G06V 30/224
See application file for complete search history.

(56) References Cited

U.S. PATENT DOCUMENTS

| 10,713,928 | B1 * | 7/2020 | Gerstberger | ..... G08B 13/19645 |
|---|---|---|---|---|
| 11,196,907 | B1 * | 12/2021 | Fu | ............... G08B 13/19632 |

(Continued)

FOREIGN PATENT DOCUMENTS

WO    WO-2018106437 A2 *    6/2018    ........... G06F 16/487

*Primary Examiner* — Maria E Vazquez Colon
(74) *Attorney, Agent, or Firm* — AVEK IP, LLC; Mark C. Young

(57) ABSTRACT

This disclosure relates to a system and method for facilitating security monitoring by a security monitoring apparatus installed at a location of interest. In some embodiments the security monitoring apparatus is configured to communicate with a server and/or a central monitoring station and incorporates an alarm sensor, a user interface, a doorbell module, and/or other components. The doorbell module may include a camera, a doorbell actuator, a motion detector, a system enabling two-way communication with a user device, an identification interrogator to identify a person, animal, or object, and/or other components.

19 Claims, 6 Drawing Sheets

(51) Int. Cl.
  *G06V 40/16* (2022.01)
  *G06V 40/18* (2022.01)

(56) References Cited

U.S. PATENT DOCUMENTS

| | | | |
|---|---|---|---|
| 2015/0363989 A1* | 12/2015 | Scalisi | H04N 7/188 |
| | | | 340/5.7 |
| 2018/0139332 A1* | 5/2018 | Kerzner | G08B 21/0476 |
| 2018/0191930 A1* | 7/2018 | Jeong | H04N 23/51 |
| 2018/0350213 A1* | 12/2018 | Bart | H04N 7/186 |
| 2019/0066471 A1* | 2/2019 | Jeon | G08B 13/19613 |

* cited by examiner

SECURITY SYSTEM WITH DOORBELL, CAMERA AND IDENTIFICATION CAPABILITY

FIELD OF THE DISCLOSURE

This disclosure relates to generally to security system technology, and more particularly to a system and method configured to integrate doorbell, camera and identification capabilities into a security system.

BACKGROUND

Security systems configured to electronically monitor houses, businesses and other locations are known. Typically, responsive to detecting unauthorized entry and/or movement at a house or business, these systems generate an audible alarm and notify an alarm services provider of the unauthorized entry and/or movement. Some known security systems may also incorporate video capability, for instance the use of video cameras to monitor building entrances from a remote location. However these systems are generally limited in terms of their capability to identify persons or objects that are present in the locations of interest. In addition, known security systems often suffer from the limitation of an intermediary between the system and the end user, for instance a central monitoring station where alarm events are screened to determine whether authorities and/or the end user should be notified. These limitations can result in significant delays in reporting suspicious activity that can put personal safety and/or property at risk. Furthermore systems that are not integrated with a doorbell and a remote intercom system enabling two-way communication between a user ringing a doorbell and the end user permit a criminal to use the doorbell to determine whether or not anyone is present in the building prior to attempting to commit a crime. A security system integrating alarm condition detection, motion detection, electronic identification, doorbell video camera, remote monitoring, and remote two-way intercom capabilities can enhance personal safety, protect property, and interface with other systems such as package delivery tracking to increase business efficiency, convenience, and security.

SUMMARY

The present disclosure describes systems and methods for implementing a security system incorporating doorbell, camera, and/or electronic identification features.

One aspect of the present disclosure relates to a security system comprising a server configured to facilitate electronic storage of alarm information associated with an alarm event, wherein the server is further configured to facilitate electronic storage of video information associated with a still image and/or a video clip, and a security monitoring device operatively linked with the server. The security monitoring device may comprise an alarm sensor configured to detect an alarm event and to generate an alarm signal associated with the alarm event, a camera configured to acquire the still image and/or video clip; and a doorbell actuator configured to cause an actuation signal to be generated upon actuation, wherein the actuation signal is configured to cause a doorbell device to provide an indication that the doorbell actuator has been actuated. The security monitoring device may comprise one or more processors operatively linked with the alarm sensor, the doorbell, and the camera, wherein at least one of the one or more processors is configured to execute an alarm program component causing the at least one processor to facilitate receipt of the alarm signal, generate alarm information associated with the alarm event, and facilitate transmission of the alarm information to the server. Also, at least one of the one or more processors is configured to execute a video program component causing the at least one processor to facilitate receipt the of the still image and/or video clip, generate video information associated with the still image and/or video clip, and facilitate transmission of the video information to the server. Additionally, at least one of the one or more processors is configured to execute a doorbell program component causing the at least one processor to facilitate receipt the of the actuation signal and execute the video program component based on receipt of the actuation signal. The server is further configured to facilitate transmission of at least part of the alarm information and at least part of the video information to a user device associated with an end user.

In another aspect, the security monitoring device further comprises an identification interrogator configured to receive identification information identifying a person, animal, or object, and to communicate the identification information to at least one of the one or more processors.

In another aspect, the identification information includes at least one of radio frequency identification (RFID) tag information, a code transmitted via near field communication (NFC), a barcode, a universal product code (UPC), a voice characteristic, deoxyribonucleic acid (DNA) information, a fingerprint scan, a palm print scan, an iris scan, a retinal scan, or a facial image.

In another aspect, at least one of the one or more processors is further configured to execute an identification program component causing the at least one processor to facilitate receipt of the identification information, attempt to identify the person, animal, or object based on the received identification information, and facilitate transmission of the result of the identification attempt to the server.

In another aspect, executing the identification program component further causes at least one of the one or more processors to modify at least one security system setting based on the identification information, and wherein modifying the at least one system setting includes a disarming of the security system or an arming of the security system.

In another aspect, the server is further configured to facilitate transmission of at least one of (a) a notification of an identity of a person, an animal, or an object and (b) the still image and/or video clip to the user device, the user device being configured to present the notification of the identity of the person, animal, or object and/or the still image and/or video clip to the end user.

In another aspect, the security system further comprises a doorbell module including a doorbell module housing, the doorbell actuator, the identification interrogator, and a display configured to indicate a system status and/or an event, wherein the system status and/or event includes at least one of an actuation of the doorbell actuator and an alarm event, and wherein the doorbell actuator, the identification interrogator, and the display are located in or on the doorbell module housing.

In another aspect, the security system further comprises a doorbell module including a doorbell module housing, a camera, the doorbell actuator, and the identification interrogator, wherein the camera, the doorbell actuator, and the identification interrogator are located in or on the doorbell module housing.

In another aspect, the doorbell module further comprises a display configured to indicate a system status and/or an event, wherein the system status and/or event includes at least one of an actuation of the doorbell actuator and an alarm event.

In another aspect, the security system further comprises a motion detector configured to generate a motion signal associated with a detected motion, wherein at least one of the one or more processors is further configured to execute a motion program component causing the at least one processor to facilitate receipt of the motion signal and to execute, based on receipt of the motion signal, the video program component causing the at least one processor to facilitate transmission of video information to the server.

In another aspect, the security monitoring device further comprises a microphone and a speaker, the microphone and speaker being configured to facilitate substantially real-time audio communication between a person within an audio communication range of the security monitoring device and a user device associated with an end user, the user device being configured for substantially real-time audio communication.

In another aspect, the security system further comprises a central monitoring station operatively linked with the security monitoring device and configured to receive the alarm information, the video information, and the identity of the person, animal, or object.

Another aspect of the present disclosure relates to a method for providing security comprising providing a server to facilitate electronic storage of alarm information associated with an alarm event and to facilitate electronic storage of video information associated with a still image and/or a video clip and providing a security monitoring device operatively linked with the server. Providing the security monitoring device further comprises providing an alarm sensor to detect an alarm event and to generate an alarm signal associated with the alarm event, providing a camera to acquire still image and/or video clip, providing a doorbell actuator to cause an actuation signal to be generated upon actuation, wherein the actuation signal causes a doorbell device to provide an indication that the doorbell actuator has been actuated, and providing at least one processor operatively linked with the alarm sensor and the camera. Providing the security monitoring device further comprises providing an alarm program component that, when executed on the at least one processor, causes the at least one processor to facilitate receipt of the alarm signal, generate alarm information associated with the alarm event, and facilitate transmission of the alarm information to the server, providing a video program component that, when executed on the at least one processor, causes the at least one processor to facilitate receipt of the still image and/or video clip, generate video information associated with the still image and/or video clip, and facilitate transmission of the video information to the server, providing a doorbell program component that, when executed on the at least one processor, causes the at least one processor to facilitate receipt the of the actuation signal and execute the video program component based on receipt of the actuation signal. The method further comprises executing at least the video program component the at least one processor, and facilitating, via the server, transmission of at least part of the video information to a user device associated with an end user.

In another aspect, the method further comprises providing an identification interrogator to receive identification information identifying a person, an animal or an object, and to communicate the identification information the at least one processor.

In another aspect of the above method, the identification information includes at least one of RFID tag information, a code transmitted via NFC, a barcode, a UPC code, a voice characteristic, DNA information, a fingerprint scan, a palm print scan, an iris scan, a retinal scan, or a facial image.

In another aspect, the method further comprises executing, by the at least one processor, an identification program component causing the at least one processor to facilitate receipt of the identification information, attempt to identify the person, animal, or object based on the received identification information, and facilitate the transmission of the result of the identification attempt to the server.

In another aspect, the method further comprises executing the identification program component further causes the at least one processor to modify at least one security system setting based on the identification information, and wherein modifying the at least one system setting includes a disarming of the security system or an arming of the security system.

In another aspect, the method further comprises facilitating, by the server, transmission of at least one of a notification of an identity of the person, animal, or object and the still image and/or video clip to the user device, and presenting, via a user interface of the user device, the notification of the identity of the person, animal, or object, and/or the still image and/or video clip, to the end user.

In another aspect, the method further comprises providing a motion detector to generate a motion signal associated with a detected motion, executing, by the at least one processor, a motion program component causing the at least one processor to facilitate receipt of the motion signal, and, based on receipt of the motion signal, executing, by the at least one processor, the video program component causing the at least one processor to facilitate transmission of video information to the server.

In another aspect, the method further comprises providing a microphone and a speaker to facilitate substantially real-time audio communication between a person within an audio communication range of the doorbell module and the user device, the user device being configured for substantially real-time audio communication.

In another aspect, the method further comprises providing a central monitoring station operatively linked with the security monitoring device and receiving, by the central monitoring station, the information associated with the alarm event, the video information, and/or the identity of the person, animal, or object.

In another aspect, the method further comprises providing a doorbell module housing including, in or on the doorbell module housing, the doorbell actuator, the identification interrogator, and a display configured to indicate a system status and/or an event, wherein the system status and/or event includes at least one of an actuation of the doorbell actuator and the alarm event.

Yet another aspect of the present disclosure relates to a security system comprising an alarm sensor configured to detect an alarm event and to generate an alarm signal associated with the alarm event, an identification interrogator configured to receive identification information associated with a person, an animal or an object, a doorbell actuator configured to cause an actuation signal to be generated upon actuation, wherein the actuation signal is configured to cause a doorbell device to provide an indication that the doorbell actuator has been actuated, and one or more processors operatively linked with the alarm sensor, the doorbell actuator, and the identification interrogator. In this aspect, at least one of the one or more processors is configured to execute an alarm program component causing the at least one processor to facilitate receipt of the alarm signal and generate alarm information associated with the alarm event; at least one of the one or more processors is configured to execute an identification program component causing the at least one processor to facilitate receipt of the identification information and attempt to identify the person, animal, or object based on the received identification information; and at least one of the one or more processors is configured to execute a doorbell program component causing the at least one processor to facilitate receipt the of the actuation signal.

In another aspect, the identification information associated with a person, an animal or an object includes at least one of RFID tag information, a code transmitted via NFC, a barcode, a UPC code, a voice characteristic, DNA information, a fingerprint scan, a palm print scan, an iris scan, a retinal scan, or a facial image.

In another aspect, the security system further comprises a doorbell module including a doorbell module housing, the doorbell actuator, the identification interrogator, and a display configured to indicate a system status and/or an event, wherein the system status and/or event includes at least one of an actuation of the doorbell actuator and the alarm event, and wherein the doorbell actuator, the identification interrogator, and the display are located in or on the doorbell module housing.

In another aspect, the security system further comprises a camera configured to acquire a still image and/or a video clip and communicate information associated with the still image and/or video clip to the at least one processor, wherein at least one of the one or more processors is configured to execute a video program component causing the at least one processor to facilitate receipt the of the still image and/or video clip and generate video information associated with the still image and/or video clip.

In another aspect, the security system further comprises a server operatively linked to the security monitoring device, wherein the server is configured to receive and facilitate electronic storage of at least a part of the alarm information associated with an alarm event; the server is configured to receive and facilitate electronic storage of at least part of the identification information associated with a person, an animal or an object; the server is configured to receive and facilitate electronic storage of at least part of the video information associated with the still image and/or video clip; and the server is configured to facilitate transmission of at least part of the alarm information, at least part of the identification information, and at least part of the video information to a user device associated with an end user, the user device being configured to present the alarm information, the identification information, and/or the video information to the end user.

In another aspect, the security system further comprises a doorbell module including a doorbell module housing, the camera, the doorbell actuator, and the identification interrogator, wherein the camera, the doorbell actuator, and the identification interrogator are located in or on the doorbell module housing.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals generally designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
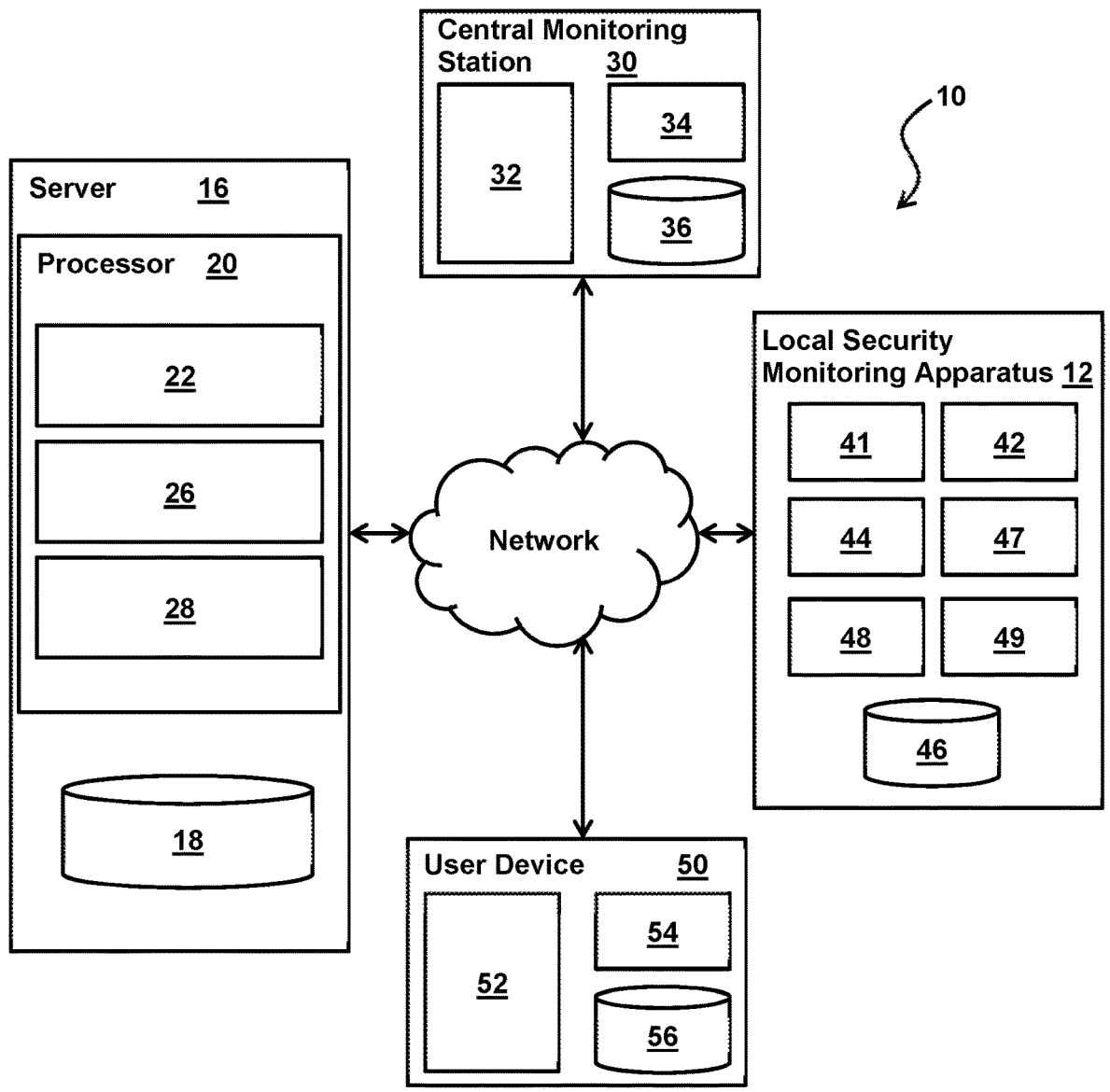
FIG. 1 illustrates aspects of a system configured to facilitate monitoring of a location of interest by a monitoring apparatus according to one or more embodiments.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step", "operation" and/or "block" may be used herein to connote different elements of methods employed, the terms should not be interpreted as implying any particular order among or between various steps herein disclosed unless and except when the order of individual steps is explicitly described.

One or more embodiments provide a security system integrating alarm condition detection, video monitoring, motion detection, electronic identification, doorbell actuation, remote monitoring, and/or remote two-way intercom capabilities into a single system. Some embodiments may include a separately housed module conveniently combining a video camera, a doorbell actuator, a motion detector, an electronic identification reader, and/or other components into a single module. Such a module may be referred to, for instance, as a doorbell module or a doorbell camera module. Any or all of these modules may be configured so that they can be added to a pre-existing security system.

In contrast to previously available systems, embodiments of the present disclosure enhance the user's ability to monitor a security system from a remote location. The doorbell module may present video information such as a still image or video clip to an end user on a graphical user interface of a remote device associated with the end user via an electronic application (an "app") running on the remote device, for example. Video information may be provided to the user based on an alarm event, the detection of motion, the ringing of the doorbell and/or other criteria, or on demand. An end user in a remote location may interact with a person ringing the doorbell using two-way audio communication via a device such as a computer, tablet or mobile phone. An intruder may thereby be discouraged by the substantially real-time monitoring as revealed by the user's voice, combined with the possibility or impression that the user is present inside the building. An electronic identification feature not only enables the system to automatically allow recognized individuals to enter or let a pet in through a pet door, but also provides useful information to the end user (e.g. a child has arrived home from school, a formerly authorized person attempted entry, or an anticipated delivery has arrived). The integrated security system allows residential and commercial customers to answer their doors remotely from their mobile device. End users can see, hear, and speak to visitors through the system on their mobile phones. In addition, electronic identification may provide information about important or valuable deliveries to enhance security or business efficiency.

FIG. 1 illustrates a system 10 configured to facilitate monitoring of a location of interest. System 10 may be configured such that, responsive to a doorbell actuation, motion detection, receipt of identification information, alarm event at the location of interest, and/or satisfaction of other criteria, clips of security video information and/or substantially real-time images and any other identifying information may be presented to an end user on a user device 50 associated with the end user, and/or to a reviewer via a central monitoring station 30. The end user and/or reviewer can use the information to facilitate identification of and/or interaction with a visitor, delivery person, package, or intruder. This allows the end user and/or the reviewer to determine whether or not there is a security issue, or another time-critical situation requiring prompt attention, based on knowledge that is gained from viewing the clips from and/or other information such as identification information obtained from the location of interest.

System 10 may be configured to facilitate remote verification of alarm events by the end user and/or the reviewer. System 10 may be configured to allow review of the clips and/or substantially live images by the reviewer at central station 30 only responsive to detection of an alarm event, and only for a temporary period of time following the detection of the alarm event. System 10 may prevent reviewers at central station 30 from going back to the clips and/or substantially live images from cameras monitoring the location of interest at an unauthorized time. System 10 may be configured to facilitate monitoring a location of interest using a motion sensor, a video camera, a doorbell, an electronic identification device and/or other systems or sensors.

Local security monitoring apparatus 12 may be configured to monitor the security of a location of interest and detect alarm events. Local security monitoring apparatus 12 may be installed at the location of interest, for example. In some embodiments, local security monitoring device 12 may include one or more of a sensor 41, a user interface 42, a control panel/processor 44, electronic storage 46, a doorbell module 47, a local sounder 48 (e.g., a speaker and/or other sound generation components configured to generate an audible alarm sound at the location of interest), a camera 49, and/or other components. The location of interest may be and/or include one or more structures such as a house, an office building, a warehouse, a garage, a restaurant and/or other businesses, a storage unit, a museum and/or other public buildings, and/or other structures; geographical areas such as fenced yards (e.g., a backyard, a company vehicle yard, etc.), parks, parking lots, and/or other geographical areas; and/or other locations of interest. Responsive to detecting an alarm event, local security monitoring apparatus 12 may generate an audible alarm noise via local sounder 48 and/or other devices, generate an indication of the detected alarm event for transmission to central monitoring station 30, server 16, and/or other devices, and/or take other actions. An alarm event may include one or more of a perimeter breach, unexpected and/or unauthorized movement, detection of a person or persons in an unauthorized area of the location of interest, detection of smoke, carbon monoxide and/or water, and/or other alarm events. In some embodiments, the indication of the detected alarm event may be an electronic signal transmitted from security monitoring apparatus 12. In some embodiments, the indication of the detected alarm event may include sensor information from sensor(s) 48, information from doorbell module 47, video information from camera(s) 49, and/or other information.

Sensors 41 may be configured to generate output signals that convey information related to perimeter breaches, unexpected movement, detection of smoke and/or carbon monoxide and/or other alarm events for the location of interest. Sensors 41 may be operatively coupled to processor 44. Sensors 41 may be configured to generate the output signals substantially continuously, at pre-determined intervals, and/or at other times. Sensors 41 may include proximity sensors (e.g., magnetic proximity sensors), motion sensors, thermal sensors, infrared sensors, pressure sensors, beam fence (e.g., laser fences) sensors, smoke sensors, carbon monoxide sensors, water sensors, and/or other sensors. Any number and/or type of sensors 41 may be placed in and/or around the location of interest.

One or more cameras 49 may be configured to acquire visual information representing the location of interest (e.g., the interior and/or exterior areas of a house and/or other locations of interest). Any number of individual cameras 49 may be positioned at various locations in and/or around the location of interest. Each camera 49 may be configured such that the visual information includes views of exterior areas of the location of interest, one or more interior spaces (e.g., rooms) of the location of interest, geographical areas such as fenced yards (e.g., a backyard, a company vehicle yard, etc.), parks, parking lots, and/or other geographical areas, and/or other areas to capture visual images of activities that occur at or near the location of interest, and/or in other areas. The visual images may include one or more still images and/or one or more video clips. Camera 49 may be operatively coupled to processor 44, for instance using a wired or wireless connection as is known in the art or described herein. In some embodiments, camera 49 may include a transmitter and/or a receiver to facilitate communication with processor 44, central monitoring station 30, server 16, and/or user device 50. In some embodiments, camera 49 may be a standalone camera. In some embodiments, camera 49 may include and/or be coupled with a digital video recorder (DVR) system, a network video recorder (NVR) system and/or other recording devices configured to record the visual information, the sensor information, and/or other information. In some embodiments, the visual information may be received from a third party camera, digital video recorder (DVR) system and/or network video recorder (NVR) system.

Figure 2:
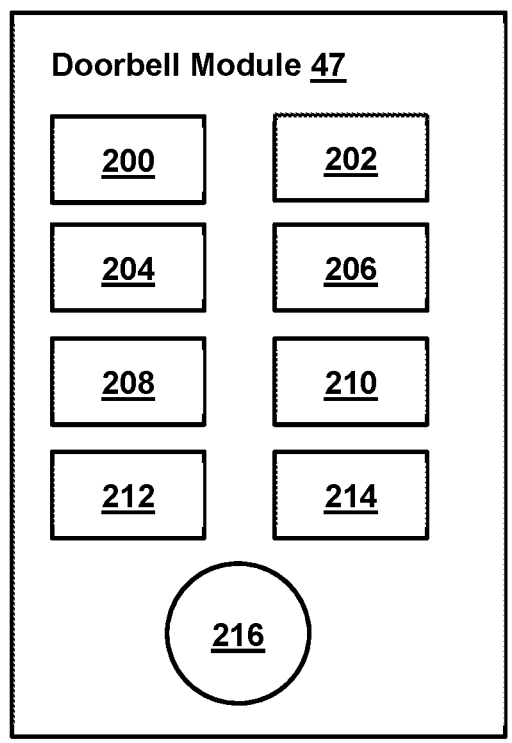
FIG. 2 illustrates aspects of a doorbell module according to one or more embodiments.

Various embodiments of doorbell module 47 of FIG. 1 are contemplated and encompassed by the present disclosure. For example, FIG. 2 illustrates an embodiment of doorbell module 47 incorporating a camera 200. Camera 200 may be the same as or similar to camera 49 of security monitoring apparatus 12, or it may be a different camera. Camera 200 may be provided as an alternative to camera 49, or in addition to camera 49. Camera 200 may be operatively coupled to processor 44 (for instance using a wired or wireless connection as is known in the art or described herein) and configured to acquire still images and/or video clips providing views of an area of interest.

In some embodiments, doorbell module 47 may include one or more motion detectors 202 configured to detect and generate a motion signal associated with motion in the area of interest. The motion detectors may include one or more motion detection systems. In some embodiments the motion detector is a video motion detection system. Video motion detection (VMD) is a way of defining activity in a scene by analyzing the differences that occur in a series of images. This is usually done by pixel matching or frame referencing. Any change between frames exceeding a predetermined threshold is regarded as a 'detection'. In some systems, specific areas of a screen where any visual changes should be detected can be defined. Motion detectors in other systems may include passive infrared (PIR) sensors, active infrared sensors, vibration detectors, electric or magnetic field detectors, pressure detectors and other motion dectectors known in the art. In some embodiments, one or more motion detectors may located in or distributed among various parts of the system, for instance in doorbell module 47, in camera module 49, and/or among sensors 48 of the security monitoring apparatus 12 of FIG. 1.

In one or more embodiments, doorbell module 47 may incorporate an identification interrogator/reader 204 operatively coupled to processor 44 and configured to receive identifying information associated with a person, animal, or object. Identifying information may include one or more of radio frequency identification (RFID) tag information, a code transmitted via near field communication (NFC), a barcode, Universal Product Code (UPC) information, a voice characteristic, deoxyribonucleic acid (DNA) or other genetic information, a fingerprint scan, a palm print scan, an iris scan, a retinal scan, a facial image for facial recognition, and other identifying information. By way of example, the RFID tag information could be included in a proximity card and that identifying information could be read by a proximity card reader (interrogator) 204. In some embodiments, the proximity card/ready system could operate in the 125 kHz frequency band. Camera 200 may provide at least part of the functionality of identification interrogator 204. For instance, identification may be based at least in part on features present in an image acquired by the camera. In some embodiments, one or more identification interrogators may be located in or distributed among various parts of the system, for instance in doorbell module 47 and/or among sensors 48 of the security monitoring apparatus 12 of FIG. 1.

A display 206 may be included in doorbell module 47 to provide a user with information regarding the system status. The display may include one or more of a liquid crystal display (LCD), one or more light-emitting diodes (LEDs), one or more organic LEDs (OLEDs), a reflective display and/or other visual display technology. The display may be used to indicate aspects of system status including, but not limited to, "on or "off" status, whether the system is armed or disarmed, whether a security perimeter has been breached, detection of motion in an area of interest, use of an identification interrogator, actuation of a doorbell actuator, whether an intercom system is in use, etc.

In one or more embodiments, doorbell module 47 may further include components of a two-way communication system comprising a microphone 208 and a speaker 210. The microphone and speaker may be used for local communication, and/or for communication between a user located near security monitoring apparatus 12 and central monitoring station 30 and/or user device 50 associated with an end user and configured for audio communication. In order for the user to be able to hear and be heard by central monitoring station personnel and/or the end user, it may be necessary for the user to be within a communication range of doorbell module 47. The communication range may be determined by factors including, but not limited to, the sensitivity of the microphone, the volume of the speaker, the volume and clarity of the speech of the user and/or the end user, electronic noise and/or interference, background noise, and/or other factors.

In some embodiments, doorbell module 47 may include a transmitter 212 and a receiver 214 to facilitate communication with processor 44, central monitoring station 30, server 16, and/or user device 50. In various embodiments, any or all of said communication may be implemented via a wired or wireless network, or by a combination of wired and wireless methods as is known in the art or described herein. Doorbell module 47 may further include a doorbell actuator 216 configured to cause an actuation signal to be generated upon actuation. The actuation signal may cause a doorbell device (not shown) to provide an indication to the end user that the doorbell actuator has been actuated. For example, the indication may be an auditory indication such as a bell, chime, tone, buzzer, audio clip, musical excerpt, or another auditory indication. Alternatively or additionally, the indication may be a visual indication, for example an indicator on a display or a continuous or flashing light, or a combination of auditory and visual indications. In some embodiments, the indication may be presented via user interface 42 of security monitoring apparatus 12, via a display associated with doorbell module 47, via display 206 associated with doorbell module 47, via a user interface 52 of user device 50, and/or via other means.

In one or more embodiments, doorbell module 47 may comprise a doorbell module housing incorporating camera 200, motion detector 202, identification interrogator 204, display 206, microphone 208, speaker 210, transmitter 212, receiver 214, and/or doorbell actuator 216 in or on the housing. The housing may be sealed to protect components from exposure to weather, ultraviolet radiation, tampering and/or disabling or other risks while providing user access to the doorbell actuator, interrogator, and/or other components intended to be user-accessible. The doorbell module housing may be configured for mounting on a door, wall, window, fence or other surface. In some embodiments, the mounting configuration of the housing may be designed to prevent removal or disabling of, or tampering with, the doorbell module. Doorbell module 49 incorporating an identification interrogator/reader 204, an intercom system, and/or a doorbell actuator 216 would typically be located near a building entrance or exit, however other locations of the doorbell module are contemplated by this disclosure, and the foregoing embodiments are not limited to such locations. While doorbell actuator 216 may be a user operated switch like an actuator button, some embodiments may use other doorbell actuators. In some embodiments the doorbell actuator may be a combination of a video camera and video motion detection software that can identify motion in the proximity of the doorbell module and use that information to trigger the indication by the doorbell device. That information could also be sent to the control panel processor 44 to intiate other actions like recording video information, triggering an alarm, etc. as is further described herein.

Figure 3:
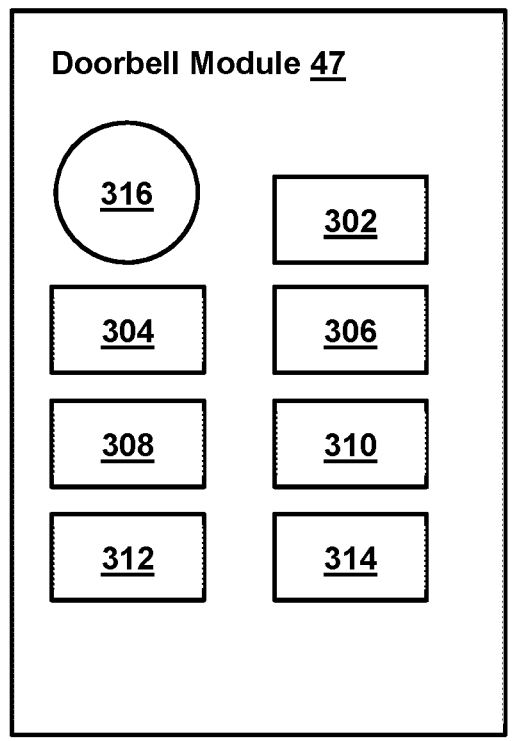
FIG. 3 illustrates aspects of a doorbell module according to one or more embodiments.

FIG. 3 illustrates another possible embodiment of doorbell module 47 of FIG. 1. The embodiment of FIG. 3 does not include a camera, for instance a camera the same as or similar to camera 200 of FIG. 2. Components 302-316 are the same as or similar to components 202-216 described above, respectively, and therefore descriptions will not be reiterated here.

In one or more embodiments, security system 12 may be configured to obtain video information from camera 49 of FIG. 1 and transmit at least part of the video information to central monitoring station 30, server 16, and/or user device 50. In one or more embodiments, server 16 may be configured to facilitate transmission of information from doorbell module 47 and at least part of the video information from camera 49 to a user device 50 associated with an end user, for instance via an app running on user device 50 and/or server 16. Information from doorbell module 47 may include information from motion detector 202, 302; information from identification interrogator 204, 304; audio information obtained via microphone 208, 308; an indication that doorbell actuator 216, 316 has been actuated; and/or other information.

The foregoing embodiments are not intended to be limiting, and embodiments incorporating various combinations of the components shown in FIG. 2 and FIG. 3 are contemplated and encompassed by the present disclosure. For example, some embodiments of doorbell module 47 may exclude identification interrogator 204, 304. In some embodiments, an identification interrogator may be included elsewhere in security monitoring system 12, or may be excluded altogether.

Figure 4:
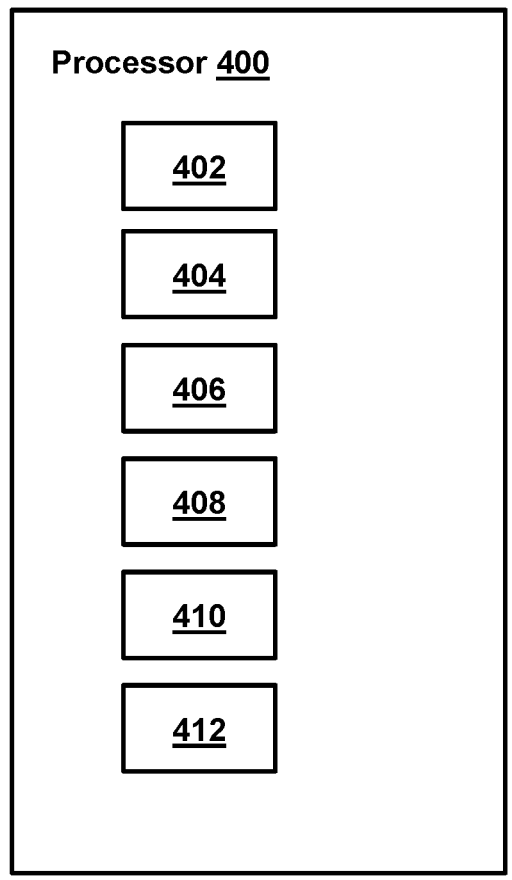
FIG. 4 illustrates aspects of a processor configured to execute program components according to one or more embodiments.

By way of non-limiting example, FIG. 4 illustrates processor 400 configured to execute program components such as program components 402-412 according to one or more embodiments. In this example, processor 400 corresponds to control panel/processor 44 of security monitoring apparatus 12. However a person skilled in the art will readily understand that any or all of the program components could be executed on processor 44, processor 20 of the server 16, processor 34 of central monitoring station 30, processor 54 of user device 50 and/or other processors without departing from the spirit and scope of the disclosure. Similarly, processor 400 may represent one or more processors, for example a plurality of processors distributed within or among components 12, 16, 30, and/or 50.

In one or more embodiments, processor 400 may be configured to execute alarm program component 402 causing the processor to facilitate receiving and/or monitoring alarm signals associated with alarm events, for instance information from sensors 41, camera 49, and/or doorbell module 47 of security monitoring apparatus 12. The alarm program component may cause the processor to detect an alarm event based on the alarm signals and facilitate transmission of an indication that an alarm event has been detected to at least one of display program component 404, server 16, central monitoring station 30, and user device 50. The alarm program component may cause local sounder 48 to generate an audible alarm sound upon detection and/or verification of an alarm event. In some embodiments, the indication may comprise a notification via one or more of an in app message, a text message, an email, a phone call, a tweet, and/or other notifications.

In one or more embodiments, processor 400 may be configured to execute display program component 404 causing the processor to facilitate displaying an indication of system status via an indicator or display 206, 306. In some embodiments the display may be included in security monitoring apparatus 12, for example in user interface 42 or as part of doorbell module 47. The display may provide a user with one or more indications of system status, for example including, but not limited to, whether the system is on or off, whether the system is armed or disarmed, whether there has been a breach of the perimeter monitored by the security system, actuation of the doorbell actuator, use of the intercom system, detection of motion, use of the identification interrogator, or other aspects of system status. In some embodiments, the display may include one or more LEDs. The display module may cause the LED display to provide status indications, for instance a solid green LED to indicate that the system is on and armed, a flashing yellow LED to indicate that the interrogator is in use, a blue LED to indicate that a person, animal, or object has been identified based on information obtained by the interrogator, a solid red LED to indicate that the system is disarmed, and/or a flashing red LED to indicate a breach. In some embodiments the LED display may use different colors and/or display methods to indicate status, or the display may assume other forms such as an LCD. In some embodiments, the display program component may be configured to provide an audible indication of status.

In one or more embodiments, processor 400 may be configured to execute motion program component 406 causing the processor to facilitate receiving and/or monitoring a signal from a motion detector. The motion detector may be included in security monitoring apparatus 12, for example among sensors 41 and/or incorporated in doorbell module 47 or camera module 49. The motion program component may cause the processor to detect motion in an area of interest based on the motion signal and facilitate transmission of an indication that an alarm event has been detected to at least one of display program component 404, server 16, central monitoring station 30, and user device 50. In some embodiments, the motion program component may cause local sounder 48 to generate an audible alarm sound upon detection and/or verification of motion in an area of interest. In some embodiments, the indication may comprise a notification via one or more of an in app message, a text message, an email, a phone call, a tweet, and/or other notifications.

In one or more embodiments, processor 400 may be configured to execute doorbell program component 408 causing processor 400 to facilitate receiving and/or monitoring a signal from a doorbell actuator. The doorbell actuator (e.g., 216 shown in FIG. 2) may be incorporated in doorbell module 47 of security monitoring apparatus 12, for example. In some embodiments, actuation of the doorbell actuator may cause a doorbell device to provide an indication to the end user that the doorbell actuator has been actuated. In some embodiments, execution of the doorbell program component 408 may cause processor 400 to cause a doorbell device to provide an indication to the end user that the doorbell actuator has been actuated. For example, the indication may comprise an auditory indicator such as a bell, chime, tone, buzzer, audio clip, musical excerpt, or another auditory indication. In some embodiments, the doorbell device may comprise a visual indicator, for example an indicator on a display or a continuous or flashing light, or a combination of auditory and visual indications. In some embodiments, execution of the doorbell program component 408 may cause processor 400 to facilitate transmission of an indication that the doorbell actuator has been actuated to at least one of display program component 404, server 16, central monitoring station 30, and user device 50. In some embodiments, the indication may comprise a notification via one or more of an in app message, a text message, an email, a phone call, a tweet, and/or other notifications.

In one or more embodiments, processor 400 may be configured to execute video program component 410 causing processor 400 to facilitate receiving and/or monitoring a still image or video clip from doorbell module and/or camera 49 of security monitoring apparatus 12. Executing video program component 410 may cause processor 400 to generate video information associated with the still image and/or video clip and/or facilitate transmission of the video information to the server 16. In some embodiments, video information may include the raw still images and/or video clips or processed versions thereof, for instance images or clips that have been enhanced, cropped, clipped, compressed, reduced in resolution, or otherwise processed. Video information may further include information related to one or more of a location identifier, a camera identifier, an image capture time and/or date, a video clip start time and/or date, a video clip end time and/or date, a video clip duration, metadata and/or other information, for example.

In some embodiments, execution of the video program component may cause processor 400 to facilitate generating video information in the form of a video clip with a predetermined start time and duration. For example, actuation of doorbell actuator 216 may cause doorbell program component 408 to cause processor 400 to facilitate transmission of an indication that doorbell actuator 216 has been actuated (for instance at an actuation time $T_o$) to video program component 410. In this example, execution of video program component 410 causes processor 400 to facilitate creating a video clip presenting a view of the area of interest and spanning a predetermined 45 second duration of time t such that $(T_o-5 \text{ seconds}) < t < (T_o+40 \text{ seconds})$ so as to capture a video clip of a time interval from just before the doorbell was actuated until a short time afterward. In practice, camera 49, 216, or 316 may be a video camera storing video information in electronic storage such as a memory buffer. The memory buffer may be incorporated in the camera electronics, in a DVR or NVR associated with the camera, or in other electronic storage. Execution of video program component 410 may cause processor 400 to facilitate creating a video clip spanning a time period typically including the doorbell actuation time. However in some embodiments, the entire predetermined video clip time interval may occur either before or after the doorbell actuation. In some embodiments, the video clip may comprise a compiled sequence of discontinuous time intervals.

The foregoing example is not meant to be limiting. The duration of time may be different from the above example, and may be configurable by the user in some embodiments, for instance via user interface 42 of security monitoring system 12, or via user interface 52 of user device 50. User input relating to the time interval or other system settings or parameters may be relayed to security monitoring apparatus 12 via an app running on user device 50. In one or more embodiments, execution of the video program component 410 may cause processor 400 to facilitate transmission of video information to at least one of display program component 404, server 16, central monitoring station 30, and user device 50.

In one or more embodiments, processor 400 may be configured to execute identification program component 412 causing processor 400 to facilitate receiving and/or processing identifying information obtained using an identification interrogator 204, which may include, for instance, a proximity card reader, a fingerprint reader, and/or a camera or other image acquisition system used to obtain identifying information. The identification interrogator 204 may be incorporated, for instance, in doorbell module 47 of security monitoring apparatus 12. For example, identifying information may include one or more of RFID tag information, a code transmitted via NFC, barcode information, UPC information, a voice characteristic, DNA information, a fingerprint, a palm print, an iris image, a retinal image, a facial image, and other identifying information. By way of examples, in some embodiments executing the identification program component 412 may cause processor 400 to facilitate identifying (a) a person using a proximity card assigned to that person and/or biometric information; (b) an animal or pet using an implanted RFID chip, an image, or biometric data; and/or (c) a package or other object using a machine readable identifier such as a UPC or other barcode or an RFID tag.

In some embodiments, execution of identification program component 412 may cause the processor 400 to facilitate transmission of identification information to at least one of display program component 404, server 16, central monitoring station 30, and user device 50. Identification information may include raw identification information, processed identification information, and/or identification of a person, animal, or object based on processing the received identification information. In some embodiments, the end user may be able to elect to receive a notification when a certain preselected person, animal, object, or class of objects is identified by the identification program component and/or another program component running on at least one of server 16, central monitoring station 30, and user device 50. For example, the end user may elect to receive notification that a child has arrived home from school, or that a valuable or time-sensitive shipment has arrived. In some embodiments, the notification election may be made by the user using an app running on user device 50, and the notification may also be provided by the app running on the user device, and the notification may comprise one or more of an in app message, a text message, an email, a phone call, a tweet, and/or other notifications. In some embodiments, the end user may receive additional information on the user device, for instance an indication that the system has been re-armed after a child's arrival and entrance into the home.

Processor 44, 400 may be configured to provide information processing capabilities in local security device 12 and/or system 10. As such, processor 44, 400 may comprise one or more of a digital processor, an analog processor, a digital circuit designed to process information, an analog circuit designed to process information, a state machine, other hardware processors, and/or other mechanisms for electronically processing information. Although processor 44, 400 is shown in FIG. 1 as a single entity, this is for illustrative purposes only. In some embodiments, processor 44, 400 may comprise a plurality of processing units. These processing units may be physically located within the same device (e.g., local security device 12), or processor 44, 400 may represent processing functionality of a plurality of devices operating in coordination (e.g., security monitoring apparatus 12, server 16, user device 50, central monitoring station 30).

Processor 44, 400 may be configured to execute computer program components. The computer program components may be configured to enable a user, and/or other users associated with user device 50, central monitoring station 30, and/or server 16 to interface with processor 44, 400, and/or other components of system 10, and/or provide other functionality attributed herein to processor 44, 400. The computer program components may include an alarm program component 402, a display program component 404, a motion program component 406, a doorbell program component 408, a video program component 410, an identification program component 412, and/or other components. Processor 44, 400 may be configured to execute components any or all of components 402-412 by software; hardware; firmware; some combination of software, hardware, and/or firmware; and/or other mechanisms for configuring processing capabilities on processor 44, 400.

Returning to FIG. 1, system 10 may be configured to detect alarm events as described above. In some embodiments, detecting alarm events may include determining one or more alarm event parameters based on the security video information from doorbell module 47 and/or camera 49, the output signals from sensors 41, and/or other information; obtaining alarm event criteria that describe alarm events at the location of interest; and detecting an alarm event responsive to one or more alarm event parameters satisfying one or more alarm event criteria. The one or more alarm event parameters may include, for example determinations of whether doors/windows are open/broken/etc., detection of movement, determination a direction of movement, determining that a given barrier has been breached, determining a temperature, determining an amount of water, smoke and/or carbon dioxide present, and/or other parameters. These parameters may be compared to obtained criteria. The criteria may be obtained from a user, for example, via user device 50, from central monitoring station 30, from server 16, and/or from other sources. The obtained criteria may include binary criteria (e.g., window/door open versus closed, movement versus no movement), thresholds (e.g., a temperature threshold, a water, smoke and/or carbon dioxide threshold level, a pressure level, etc.), relative criteria (e.g., movement in a first direction is permitted while movement in the opposite direction is not permitted), and/or other criteria. For example, security monitoring apparatus 12 may detect the heat signature of a person moving through a museum based on the output signals from a thermal sensor. Responsive to the person entering a restricted area (e.g., responsive to a determined location parameter satisfying restricted location criteria), security monitoring apparatus 12 may detect an alarm event and transmit an indication of the alarm event to central monitoring station 30. As another example, security monitoring apparatus 12 may detect an alarm event responsive to determining that a window was unexpectedly opened (e.g., responsive to a magnetic contact parameter satisfying open window (lack of) magnetic contact criteria) and transmit an indication that the window was unexpectedly opened to central monitoring station 30.

Central monitoring station 30 may include one or more of a user interface 32, a processor 34, electronic storage 36, and/or other components. Central monitoring station 30 may be configured to receive indications of the alarm events and/or information associated with detected alarm events (e.g., information from one or more sensors 41, doorbell module 47, camera 49, and/or other information). Central monitoring station 30 may be configured to receive the indications of the alarm events directly from security monitoring apparatus 12, from security monitoring apparatus 12 via server 16, and/or by other methods. Responsive to receiving an indication of the alarm event, central monitoring station 30 may request and/or cause one or more dispatch operators to review the received information and determine whether to call for police, fire, and/or other assistance at the location of interest. In some embodiments, central monitoring station 30 may be programmed with the electronic addresses of server 16, security monitoring apparatus 12, user device 50, and/or other devices.

In some embodiments, security monitoring apparatus 12 may have a stand-alone monitoring mode and central monitoring mode. Causing security monitoring apparatus 12 to operate in the central monitoring mode may or may not include turning security monitoring apparatus on and/or off, and/or arming and/or disarming security monitoring apparatus 12. In some embodiments, for example, security monitoring apparatus 12 may be armed and/or actively monitoring the location of interest (e.g., in the stand-alone monitoring mode) but not transmitting indications of alarm events to any remote locations. Monitoring apparatus 12 may operate as a stand-alone security system that is on and functioning but just not transmitting information outside the location of interest. Causing the monitoring apparatus to operate in the central monitoring mode may include causing the monitoring apparatus to begin such transmission (e.g., at a specific time, for a specific duration of time, etc.).

In some embodiments, server 16 may include one or more of a processor 20, electronic storage 18, and/or other components. The server may be located remotely from the central monitoring station 30 and/or other components of the system. Server 16 may be configured to communicate with one or more user devices 50, central monitoring station 30, security monitoring apparatus 12, and/or other devices according to a client/server architecture, peer to peer architecture, and/or other architectures. Server 16 may include communication lines, or ports to enable the exchange of information with a network, central monitoring station 30, user device 50, security monitoring apparatus 12, and/or other computing platforms. Server 16 may include a plurality of processors, electronic storage, hardware, software, and/or firmware components operating together to provide the functionality attributed herein to server 16. For example, server 16 may be implemented by a cloud of computing platforms operating together as a system server. In some embodiments, server 16 may be configured to facilitate electronic storage of alarm information associated with an alarm event, for example information associated with a signal from sensor 48. In some embodiments, server 16 may be configured to facilitate electronic storage of video information, for example information associated with a still image and/or a video clip obtained from doorbell module 47 and/or camera 49. In some embodiments, server 16, user device 50, central monitoring station 30, security monitoring apparatus 12, and/or other components of system 10 may be operatively linked via one or more electronic communication links. For example, such electronic communication links may be established, at least in part, via a network such as the internet and/or other networks such as telephone lines, radio systems or cellular networks. It will be appreciated that this is not intended to be limiting, and that the scope of this disclosure includes embodiments in which servers, user devices, a central monitoring station, a security monitoring apparatus, and/or other devices may be operatively linked via some other communication media.

Processor 20 may be configured to provide information processing capabilities in server 16 and/or system 10. As such, processor 20 may comprise one or more of a digital processor, an analog processor, a digital circuit designed to process information, an analog circuit designed to process information, a state machine, other hardware processors, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., server 16, or processor 20 may represent processing functionality of a plurality of devices operating in coordination (e.g., server 16, user device 50, security monitoring apparatus 12, central monitoring station 30).

Processor 20 may be configured to execute computer program components. The computer program components may be configured to enable an expert, a user, and/or other users associated with user device 50, central monitoring station 30, and/or security monitoring apparatus 12 to interface with processor 20, and/or other components of system 10, and/or provide other functionality attributed herein to processor 20. The computer program components may include a video information component 22, a communication component 26, a monitoring component 28, and/or other components. Processor 20 may be configured to execute components 22, 26, and/or 28 by software; hardware; firmware; some combination of software, hardware, and/or firmware; and/or other mechanisms for configuring processing capabilities on processor 20.

It should be appreciated that although components 22, 26, and 28 are illustrated in FIG. 1 as being co-located within a single processing unit, in embodiments in which processor 20 comprises multiple processing units, one or more of components 22, 26, and/or 28 may be located remotely from the other components (e.g., such as within central monitoring station 30, monitoring apparatus 12, user device 50, and/or other devices). The description of the functionality provided by the different components 22, 26, and/or 28 described herein is for illustrative purposes, and is not intended to be limiting, as any of components 22, 26, and/or 28 may provide more or less functionality than is described. For example, one or more of components 22, 26, and/or 28 may be eliminated, and some or all of its functionality may be provided by other components 22, 26, and/or 28. As another example, processor 20 may be configured to execute one or more additional components that may perform some or all of the functionality attributed below to one of components 22, 26, and/or 28. In some embodiments, one or more of components 22, 26, and/or 28 may be executed by a processor incorporated in user device 50, central monitoring station 30, security monitoring apparatus 12, and/or other components of system 10.

Video information component 22 may be configured to receive video information associated with a still image and/or a video clip obtained from doorbell module 47 and/or camera 49. The video information program component may be further configured to facilitate transmission of video information to user device 50, which in turn may be configured to present the video information to the user via a graphical user interface and/or by other methods. The video information may include the raw still images and/or video clips or processed versions thereof, for instance images or clips that have been enhanced, cropped, clipped, compressed, reduced in resolution, or otherwise processed. Video information may further include information related to one or more of a location identifier, a camera identifier, an image capture time and/or date, a video clip start time and/or date, a video clip end time and/or date, a video clip duration, metadata and/or other information, for example.

Figure 5:
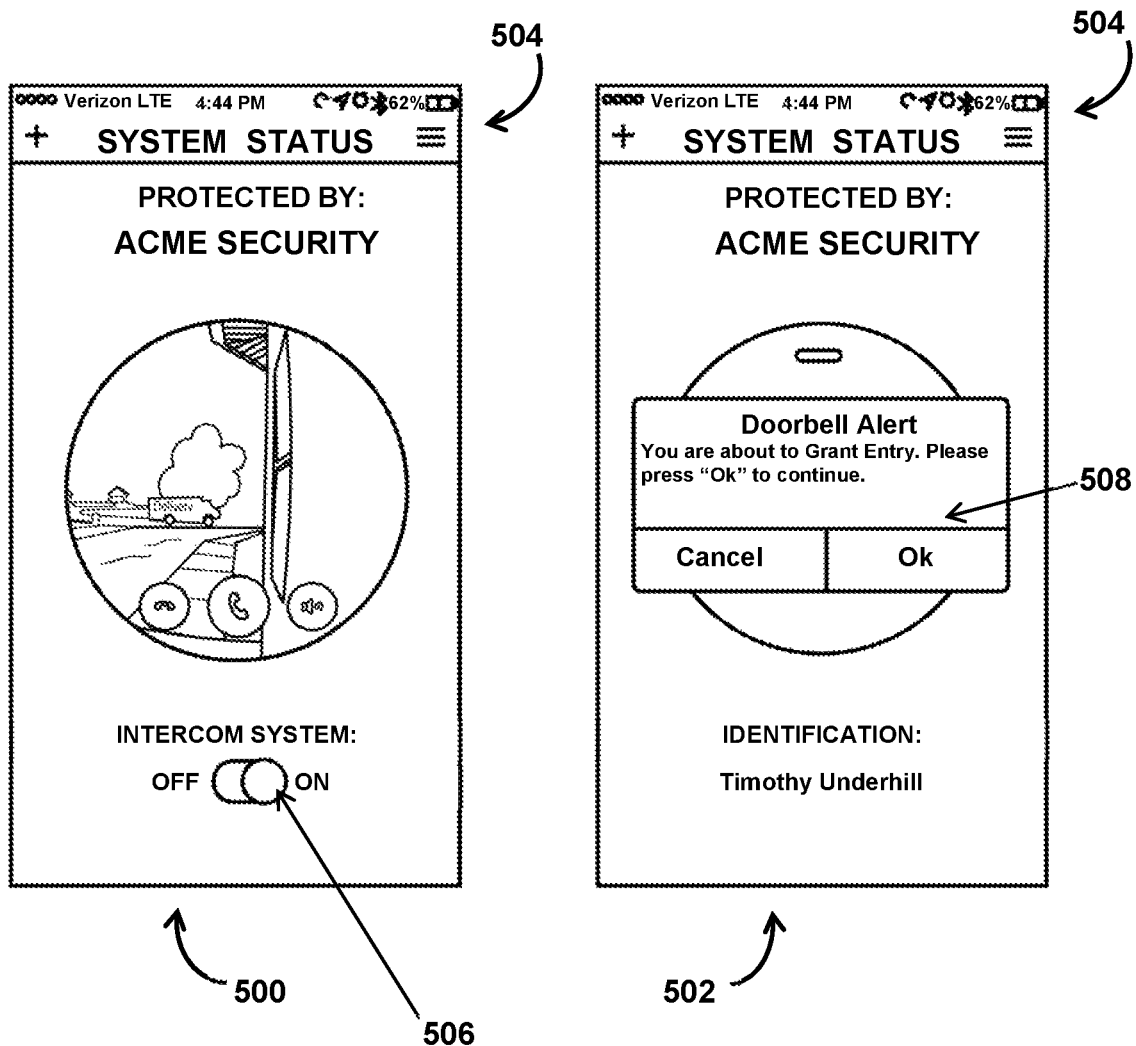
FIG. 5 illustrates example views of a graphical user interface presented to a user via an "app" running on a user device according to one or more embodiments.

In some embodiments, video information component 22 may be configured to facilitate and/or cause presentation of the video information on a graphical user interface, for instance user interface 52 of user device 50. As described above, the graphical user interface may be presented to a user on user device 50 via an app, for example. The graphical user interface may include one or more views and/or one or more fields within an individual one of the one or more views configured to receive entry and/or selection of user input. For, example, FIG. 5 illustrates example views 500, 502 of a graphical user interface 504 presented to a user via an "app" running on user device 50 (not shown in FIG. 5). FIG. 5 also illustrates fields 506, 508 for entering and/or selecting two-way communication (intercom) system information and for granting entry. In the example shown in FIG. 5, entering and/or selecting intercom system information includes toggling a button presented to the user between an "on" position (e.g., to turn the intercom system on) and an "off" position (e.g., to turn the intercom system off) or to select "Cancel" or "OK" to deny or grant entry. The app may present information relating to the identification of a person, animal, or object. For instance, the non-limiting example of FIG. 5 illustrates field 510 for presenting the name of a person based on identifying information obtained via interrogator 204 and/or identification program component 412. In this example, the end user is prompted to grant or deny entry to the person whose identity corresponds to that determined from the identifying information. In some embodiments, the end user may supplement the identifying information with video information to verify the identity of a person in the area of interest. In so doing, the end user may prevent unwanted intrusion, for instance by a person wielding a proximity card belonging to another person. By way of example, the system may incorporate a proximity card reader to read a proximity card to identify the person associated with that proximity card. To confirm the person using the proximity card is the person associated with that proximity card, the system may use video information to confirm the person's identity. This video information could be present ed to anuser of the system or could be used in conjunction with face recognition or other identification systems to confirm the identify of the person presenting the proximity card is the person associated with that proximity card.

The foregoing examples are not intended to be limiting. In some embodiments, user interface 52 of user device 50 may comprise a graphical user interface. One or more fields of the graphical user interface may include fields configured for entry and/or selection of calendar information (e.g., textual entry and/or manual selection via drop down boxes etc. of dates, times, durations, etc.) that indicates when (e.g., dates/times) the user wants the location of interest monitored, how long the user wants the location of interest monitored, and/or indicates other information.

Returning to FIG. 1, communication component 26 may be configured to cause security monitoring apparatus 12 to detect alarm events and/or transmit the indications of alarm events along with the associated alarm event information (e.g., camera images, sensor information, etc.) for the location of interest. For example, responsive to receiving an indication that monitoring should be turned on, communication component 26 may communicate (e.g., via an electronic signal) with control panel/processor 44 and/or other components of security monitoring apparatus 12 to cause security monitoring apparatus 12 to begin detecting alarm events and transmitting indications of detected alarm event and associated event information to central monitoring station 30.

In some embodiments, security monitoring apparatus 12 may be configured to detect alarm events and/or transmit indications of the alarm events and the associated alarm event information in an ongoing manner. In such embodiments, central monitoring station 30 may facilitate response activity (e.g., notification of police services, fire services, emergency assistance, etc.), and/or take other actions. Central monitoring station 30 may begin facilitating the response activity based on information received from security monitoring apparatus 12 such as alarm event information, for example.

It should be noted that the communications described in the foregoing embodiments may be accomplished wirelessly, via wires, and/or by other methods. The communications may be transmitted and/or received by hardware and/or software communications components included in user device 50, server 16, security monitoring apparatus 12, central monitoring station 30 and/or other components of system 10. The communications may be transmitted via various communications methods such as radio communication, cellular communication, internet communication, WiFi communication, Bluetooth communication, near field communication (NFC), light based communication systems (e.g., fiber optic cables) and/or other communications. In some embodiments, one or more of the components of system 10 may be configured to perform handshaking (e.g., sending and/or receiving handshaking requests) and/or other registration and/or communication operations. In some embodiments, handshaking requests may be sent and/or received via a Bluetooth link, an NFC link, a WiFi network, a cellular network, the internet, a light based communication system, radio communication, and/or other communication networks. For example, handshaking may be performed by user device 50 and sever 16 and/or other components of system 10.

User device 50 may be associated with the end user and/or other users. In some embodiments, user device 50 may include one or more of a user interface 52 (e.g., configured to display the graphical user interface described above), a processor 54, electronic storage 56, and/or other components. In some embodiments, user device 50 may be configured to communicate with server 16, central monitoring station 30, security monitoring apparatus 12, other computing platforms, and/or other devices according to peer-to-peer architecture, client/server architecture, and/or other architectures. User device 50 may include communication lines, and/or ports to enable the exchange of information with a network, other computing platforms, and/or other devices. In some embodiments, communication between user device 50 and/or other components of system 10 may be wireless and/or via wires. For example, user device 50 may communicate with server 16, central monitoring station 30, and/or security monitoring apparatus 12 wirelessly via a Wi-Fi network, via Bluetooth® technology, via NFC, via a network such as the internet, and/or other wireless methods and may include one or more of a smartphone, a tablet computer, a laptop computer, a desktop computer and/or other computing devices.

Processor 34 in central monitoring station 30, processor 54 in user device 50, and/or processor 44 in security monitoring device 12 may be configured to provide information processing capability in the individual components of system 10 in which they are included, and/or in system 10 as a whole. As such, processors 34, 44, and/or 54 may include one or more of a digital processor, an analog processor, a digital circuit designed to process information, an analog circuit designed to process information, a state machine, and/or other mechanisms for electronically processing information. Although processors 34, 44, and/or 54 are shown in FIG. 1 as single entities, this is for illustrative purposes only. In some embodiments, processor 34, 44, and/or 54 individually include a plurality of processing units. These processing units may be physically located within the same device (e.g., within central monitoring station 30, user device 50, and/or security monitoring apparatus 12), or processors 34, 44, and/or 54 may represent processing functionality of a plurality of devices operating in coordination. Processors 34, 44, and/or 54 may be configured to enable an expert and/or user associated with user device 50, central monitoring station 30, and/or security monitoring apparatus 12 to interface with server 16 and/or processor 20, and/or other devices, and/or provide other functionality attributed herein to user device 50, central monitoring station 30, and/or security monitoring device 12.

In some embodiments, user interfaces 32, 42, and 52 may be configured to provide an interface between central monitoring station 30, user device 50, and/or security monitoring apparatus 12, and a user, a dispatch operator (e.g., located at central monitoring station 30), and/or other users through which the user, a dispatch operator, and/or the other users may provide information to and receive information from central monitoring station 30, user device 50, and/or security monitoring apparatus 12. This enables data, cues, results, and/or instructions and any other communicable items, collectively referred to as "information," to be communicated between the user, a dispatch operator, and/or other users and central monitoring station 30, user device 50, security monitoring apparatus 12, and/or other components of system 10. Examples of interface devices suitable for inclusion in user interfaces 32, 42, and/or 52 comprise a touch screen, a keypad, buttons, switches, a keyboard, knobs, levers, a display screen, speakers, a microphone, an indicator light, an audible alarm, a printer, a computer mouse, and/or other interface devices. In some embodiments, user interfaces 32, 42, and/or 52 individually comprise a plurality of separate interfaces (e.g., a display screen, a mouse, and a keyboard). In some embodiments, user interfaces 32, 42, and/or 52 comprise one interface (e.g., a touchscreen, a keypad, etc.) that is provided integrally with central monitoring station 30, user device 50, and/or security monitoring apparatus 12.

It is to be understood that other communication techniques, either hard-wired or wireless, are also contemplated by the present disclosure as user interfaces 32, 42, and/or 52. For example, the present disclosure contemplates that user interfaces 32, 42, and/or 52 may be integrated with a removable storage interface provided by electronic storage 36, 46, and/or 56. In this example, information may be loaded into system 10 from removable storage (e.g., a smart card, a flash drive, a removable disk, etc.) that enables the user to customize the embodiment of system 10. Other exemplary input devices and techniques adapted for use as user interfaces 32, 42, and/or 52 comprise, but are not limited to, an RS-232 port, a Universal Serial Bus (USB) port, radio frequency (RF) link, an infrared (IR) link, or a modem (telephone, cable or other). In short, any technique for communicating information with system 10 is contemplated by the present disclosure as user interfaces 32, 42, and/or 52.

In some embodiments, electronic storage 18, 36, 46, and/or 56 may comprise electronic storage media that electronically stores information in system 10. Electronic storage 18, 36, 46, and/or 56 may be configured to store software algorithms, clips, images, information determined by processors 20, 34, 44, and/or 54, information received via user interfaces 32, 42, and/or 52, and/or other information that enables system 10 to function as described herein. The electronic storage media of electronic storage 18, 36, 46, and/or 56 may comprise one or both of system storage that is provided integrally (i.e., substantially non-removable) with one or more components of system 10 and/or removable storage that is removably connectable to one or more components of system 10 via, for example, a port (e.g., a USB port, a FireWire port, etc.) or a drive (e.g., a disk drive, etc.). Electronic storage 18, 36, 46, and/or 56 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 18, 36, 46, and/or 56 may be (in whole or in part) a separate component within one or more components of system 10, or electronic storage 18, 36, 46, and/or 56 may be provided (in whole or in part) integrally with one or more other components of system 10 (e.g., user interfaces 32, 42, and/or 52).

Figure 6:
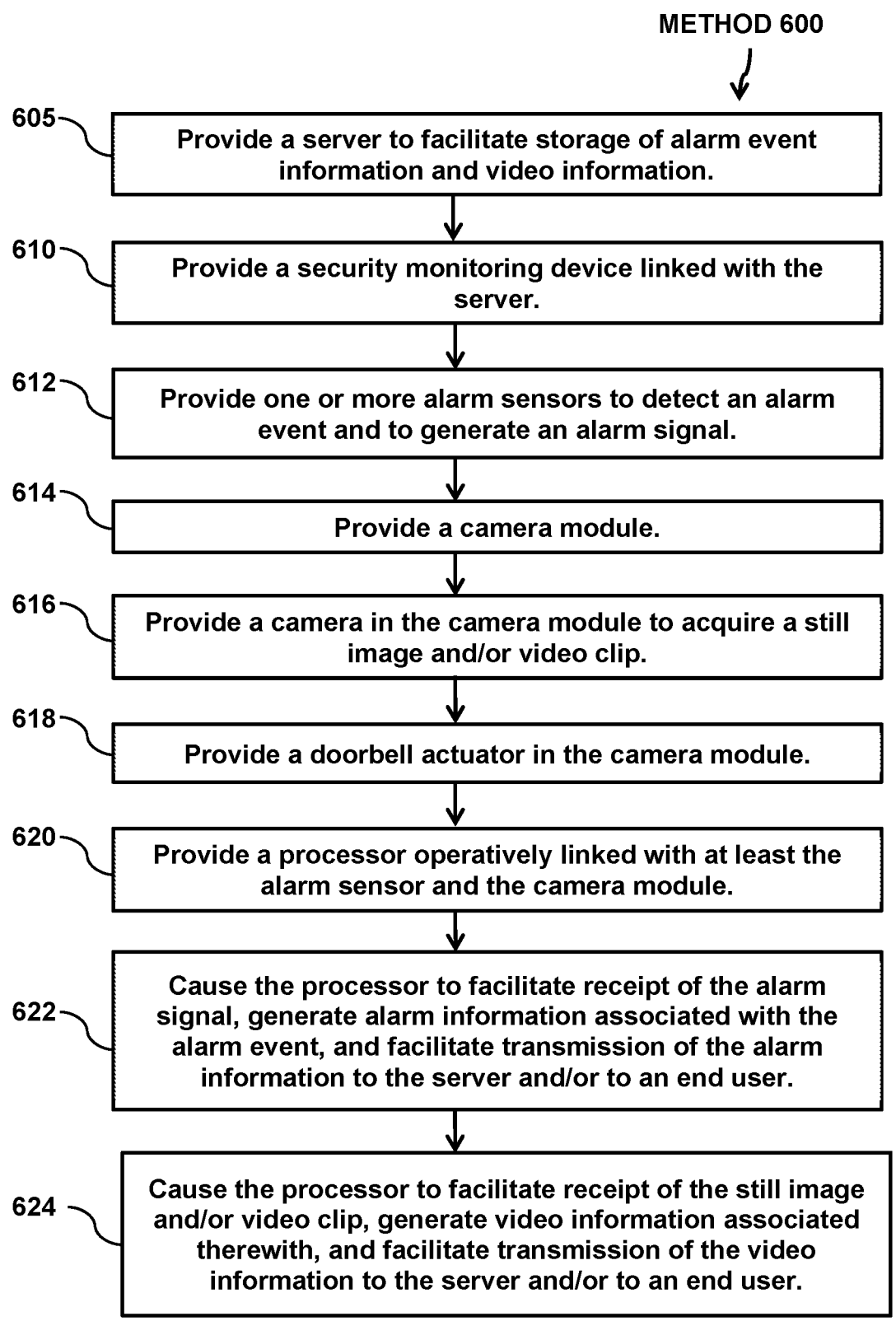
FIG. 6 illustrates aspects of a method to facilitate monitoring of a location of interest by a monitoring apparatus that includes a doorbell module according to one or more embodiments.

In one or more embodiments, the system includes at least one server and security monitoring device which may integrate alarm condition detection, motion detection, electronic identification, a camera function, doorbell function, remote monitoring, local two-way intercom, and/or remote two-way intercom capabilities into a single system. FIG. 6 illustrates an embodiment of a method 600 associated with such a system.

At an operation 605, a server (e.g. a server that is the same as or similar to server 16 shown in FIG. 1 and described herein) is provided to facilitate electronic storage of alarm information associated with an alarm event and to facilitate electronic storage of video information associated with a still image and/or a video clip. The server may be communicate with a security monitoring device (e.g. a security monitoring device that is the same as or similar to local security monitoring apparatus 12 shown in FIG. 1 and described herein). The server may be provided locally or at a site located remotely from the local security monitoring apparatus. In one or more embodiments, video information and/or alarm information may be stored in electronic storage provided in the server. In some embodiments, the server may communicate with a user device. Communication may be facilitated by, or take place via, an app running on the user device.

At an operation 610, a security monitoring device operatively linked with the server (e.g. a security monitoring device that is the same as or similar to local security monitoring apparatus 12 shown in FIG. 1 and described herein) is provided. Included in providing the security monitoring device are: (a) at an operation 612, providing one or more alarm sensors (e.g. sensors that are the same as or similar to sensors 41 shown in FIG. 1 and described herein) to detect an alarm event and to generate an alarm signal associated with the alarm event, and (b) at an operation 614, providing a doorbell module (e.g. a doorbell module that is the same as or similar to doorbell module 47 shown in FIG. 1 and described herein). Providing the camera module, in turn, may comprise providing, at an operation 616, a camera (e.g. a camera that is the same as or similar to camera 200 shown in FIG. 2 and described herein) to acquire the still image and/or video clip, and providing, at an operation 618, a doorbell actuator (e.g. a doorbell actuator that is the same as or similar to doorbell actuator 216 shown in FIG. 2 and described herein) to cause an actuation signal to be generated upon actuation, wherein the actuation signal causes a doorbell device to provide an indication that the doorbell actuator has been actuated.

In the example of FIG. 6, method 600 further includes an operation 620 comprising providing a processor (e.g. a processor that is the same as or similar to control panel/processor 44 shown in FIG. 1 and described herein) configured to run at least one program component and operatively linked with at least the alarm sensor and the doorbell module.

At an operation 622, one or more processors, for example the processor provided at operation 620, may execute an alarm program component causing the processor to facilitate receipt of the alarm signal, generate alarm information associated with the alarm event, and facilitate transmission of the alarm information to the server. A processor included in the server may facilitate transmission of at least part of the alarm information to a user device associated with an end user (e.g. a user device that is the same as or similar to user device 50 shown in FIG. 1 and described herein) and/or presenting the information to the end user via an app running on the user device.

At an operation 624, one or more processors, for example the processor provided at operation 620, may execute a video program component causing the processor to facilitate receipt of the still image and/or video clip, generate video information associated with the still image and/or video clip, and facilitate transmission of the video information to the server. A processor included in the server may execute a video information program component (e.g. a video information program component that is the same as or similar to video information program component 22 shown in FIG. 1 and described herein) to facilitate transmission of at least part of the video information to a user device associated with an end user.

Similarly, in one or more embodiments one or more processors, for example the processor provided at operation 620 may execute an alarm program component, a display program component, a motion program component, a doorbell program component, and/or an identification program component in a similar manner as described above, either alone or in combination with any of the program components aforementioned program components and/or other program components.

In one or more embodiments, any or all of the above program components may be the same as or similar to correspondingly named program components 402-412 shown in FIG. 4 and described herein.

In one or more embodiments, a processor included in the server of method 600 may be a processor that is the same as or similar to processor 20 shown in FIG. 1 and described herein.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium and/or other devices. The one or more processing devices may include one or more devices configured through hardware, firmware, and/or software to be specifically designed for execution of one or more of the operations of method 600.

Although the present technology has been described in detail for the purpose of illustration based on what are currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A security system comprising:
a server configured to facilitate electronic storage of alarm information associated with an alarm event, wherein the server is further configured to facilitate electronic storage of video information associated with a still image and/or a video clip; and
a security monitoring device operatively linked with the server, the security monitoring device comprising:
an alarm sensor configured to detect the alarm event and to generate an alarm signal associated with the alarm event;
a camera configured to acquire the still image and/or video clip; and
a doorbell actuator switch configured to cause an actuation signal to be generated upon actuation of the switch, wherein the actuation signal generated upon actuation of the switch is configured to cause a doorbell device to provide an indication that the doorbell actuator switch has been actuated;
one or more processors operatively linked with the alarm sensor, the doorbell actuator switch, and the camera, wherein:
at least one of the one or more processors is configured to execute an alarm program component causing the at least one processor to facilitate receipt of the alarm signal and in response to the alarm signal, generate alarm information associated with the alarm event, and facilitate transmission of the alarm information to the server;
at least one of the one or more processors is configured to execute a video program component in response to the alarm signal causing the at least one processor to facilitate receipt of the still image and/or video clip, generate video information associated with the still image and/or video clip, and facilitate transmission of the video information to the server;
at least one of the one or more processors is configured to execute a doorbell program component causing the at least one processor to facilitate receipt of the actuation signal and in response to the actuation signal generated upon actuation of the switch, execute the video program component based on receipt of the actuation signal; and
at least one of the one or more processors is configured to transmit an image and/or video clip and/or information to an end user and to receive a response from the end user via a user device associated with the end user; and
an identification interrogator configured to receive identification information identifying a person, animal, or object, and to communicate the identification information to at least one of the one or more processors, wherein at least one of the one or more processors is further configured to execute an identification program component operable to identify each of: a person, an animal, and a non-person or non-animal object based on the received identification information and wherein executing the identification program component further causes at least one of the one or more processors to modify at least one security system setting based on the identification by the processor of an identified person, an identified animal, and an identified non-person or non-animal object, wherein modifying the at least one system setting includes a disarming of the security system or an arming of the security system and wherein the modifying the at least one system setting is based on an identified person, identified animal, identified non-person, or identified non-animal object;
wherein the security monitoring device is configured to operate in both a stand-alone mode and a central monitoring mode;
wherein in the central monitoring mode, the system is further configured to transmit at least part of the alarm information and/or video information to a central monitoring station;
wherein the transmission to the central monitoring station occurs based on a scheduled time, a specified time window, or a detected condition associated with a security system state.

2. The security system of claim 1, wherein the identification information includes at least one of RFID tag information, a code transmitted via NFC, a barcode, a UPC code, a voice characteristic, DNA information, a fingerprint scan, a palm print scan, an iris scan, a retinal scan, or a facial image.

3. The security system of claim 1, wherein the server is further configured to facilitate transmission of at least one of (a) a notification of an identity of a person, an animal or an object and (b) the still image and/or video clip to the user device, the user device being configured to present the notification of the identity of the person, animal, or object and/or the still image and/or video clip to the end user.

4. The security system of claim 1, further comprising a doorbell module, wherein the doorbell module includes a doorbell module housing, the doorbell actuator switch, the identification interrogator, and a display configured to indicate a system status and/or an event, wherein the system status and/or event includes at least one of an actuation of the doorbell actuator switch and the alarm event, and wherein the doorbell actuator switch, the identification interrogator, and the display are located in or on the doorbell module housing.

5. The security system of claim 1, further comprising a doorbell module, wherein the doorbell module includes a doorbell module housing, the camera, the doorbell actuator switch, and the identification interrogator, and wherein the camera, the doorbell actuator switch, and the identification interrogator are located in or on the doorbell module housing.

6. The security system of claim 5, wherein the doorbell module further comprises a display configured to indicate a system status and/or an event, and wherein the system status and/or event includes at least one of an actuation of the doorbell actuator switch and an alarm event.

7. The security system of claim 1, further comprising a motion detector configured to generate a motion signal associated with a detected motion, and wherein at least one of the one or more processors is further configured to:
execute a motion program component causing the at least one processor to facilitate receipt of the motion signal; and
execute, based on receipt of the motion signal, the video program component causing the at least one processor to facilitate transmission of video information to the server.

8. The security system of claim 1, wherein the security monitoring device further comprises a microphone and a speaker, the microphone and speaker being configured to facilitate substantially real-time audio communication between a person within an audio communication range of the security monitoring device and the user device, the user device being configured for substantially real-time audio communication.

9. The security system of claim 1, further comprising the central monitoring station operatively linked with the security monitoring device and configured to receive the alarm information, the video information, and the identity of the person, animal, or object.

10. A method for providing security comprising:
providing a server to facilitate electronic storage of alarm information associated with an alarm event and to facilitate electronic storage of video information associated with a still image and/or a video clip; and
providing a security monitoring device operatively linked with the server, wherein the providing the security monitoring device further comprises:
providing an alarm sensor to detect the alarm event and to generate an alarm signal associated with the alarm event;
providing a camera to acquire the still image and/or video clip;
providing a doorbell actuator switch to cause an actuation signal to be generated upon actuation, wherein the actuation signal generated upon actuation of the switch causes a doorbell device to provide an indication that the doorbell actuator switch has been actuated;
providing at least one processor operatively linked with the alarm sensor and the camera;
providing an alarm program component that, when executed on the at least one processor, causes the at least one processor to facilitate receipt of the alarm signal and in response to the alarm signal, generate alarm information associated with the alarm event, and facilitate transmission of the alarm information to the server;
providing a video program component that, in response to the alarm signal is executed on the at least one processor, causes the at least one processor to facilitate receipt of the still image and/or video clip, generate video information associated with the still image and/or video clip, and facilitate transmission of the video information to the server;
providing a doorbell program component that, when executed on the at least one processor, causes the at least one processor to facilitate receipt of the actuation signal and in response to the actuation signal generated upon actuation of the switch execute the video program component based on receipt of the actuation signal;
providing an identification interrogator;
receiving, via the identification interrogator and/or the camera, identification information associated with a person, an animal or an object;
communicating the identification information to the at least one processor, wherein an identification program component is operable to identify each of: a person, an animal, and a non-person or non-animal object based on the received identification information and further causes the at least one processor to modify at least one security system setting based on the identification by the processor of an identified person, an identified animal, and an identified non-person or non-animal object, and wherein modifying the at least one security system setting includes a disarming of the security system or an arming of the security system and wherein the modifying the at least one system setting is based on an identified person, identified animal, identified non-person, or identified non-animal object;
configuring the security monitoring device to operate in either a stand-alone mode or a central monitoring mode and wherein, in the central monitoring mode, transmitting at least part of the alarm information and/or video information to a central monitoring station;
wherein the transmitting to the central monitoring station occurs based on a scheduled time, a specified time window, or a detected condition associated with a security system state; and
executing at least the video program component on the at least one processor;
transmitting an image and/or video clip and/or information to an end user;
receiving a response from the end user via a user device associated with the end user.

11. The method of claim 10, further comprising:
facilitating, by the server, transmission of at least one of a notification of an identity of the person, animal, or object and the still image and/or video clip to the user device; and
presenting, via a user interface of the user device, the notification of the identity of the person, animal, or object, and/or the still image and/or video clip, to the end user.

12. The method of claim 10 further comprising:
providing a motion detector to generate a motion signal associated with a detected motion;
executing, by the at least one processor, a motion program component causing the at least one processor to facilitate receipt of the motion signal; and
based on receipt of the motion signal, executing, by the at least one processor, the video program component causing the at least one processor to facilitate transmission of video information to the server.

13. The method of claim 10, further comprising providing a doorbell module housing including, in or on the doorbell module housing, the doorbell actuator switch, the identification interrogator, and a display configured to indicate a system status and/or an event, wherein the system status and/or event includes at least one of an actuation of the doorbell actuator switch and the alarm event.

14. A security system comprising:
an alarm sensor configured to detect an alarm event and to generate an alarm signal associated with the alarm event;
an identification interrogator configured to receive identification information associated with a person, an animal or an object;
a doorbell actuator switch configured to cause an actuation signal to be generated upon actuation, wherein the actuation signal generated upon actuation of the switch is configured to cause a doorbell device to provide an indication that the doorbell actuator switch has been actuated; and
one or more processors operatively linked with the alarm sensor, the doorbell actuator switch, and the identification interrogator, wherein:
at least one of the one or more processors is configured to execute an alarm program component causing the at least one processor to facilitate receipt of the alarm signal and in response to the alarm signal generate alarm information associated with the alarm event;

at least one of the one or more processors is configured to execute an identification program component in response to the alarm signal causing the at least one processor to facilitate receipt of the identification information and attempt to identify the person, animal, or object based on the received identification information;

at least one of the one or more processors is configured to execute a doorbell program component causing the at least one processor to facilitate receipt of the actuation signal generated upon actuation of the switch, and in response to the actuation signal execute a video program component;

at least one of the one or more processors is configured to transmit an image and/or video clip and/or information to an end user and to receive a response from the end user via a user device associated with the end user; and at least one of the processors is configured to identify each of: a person, an animal, and a non-person or non-animal object based on received identification information and to modify at least one security system setting based on the identification by the processor of an identified person, an identified animal, and an identified non-person or non-animal object, wherein modifying at least one security system setting includes a disarming of the security system or an arming of the security system and wherein the modifying the at least one system setting is based on an identified person, identified animal, identified non-person, or identified non-animal object;

wherein the security monitoring device is configured to operate in both a stand-alone mode and a central monitoring mode;

wherein in the central monitoring mode, the system is further configured to transmit at least part of the alarm information and/or video information to a central monitoring station;

wherein the transmission to the central monitoring station occurs based on a scheduled time, a specified time window, or a detected condition associated with a security system state.

15. The security system of claim 14, wherein the identification information includes at least one of RFID tag information, a code transmitted via NFC, a barcode, a UPC code, a voice characteristic, DNA information, a fingerprint scan, a palm print scan, an iris scan, a retinal scan, or a facial image.

16. The security system of claim 14, further comprising a doorbell module including a doorbell module housing, the doorbell actuator switch, the identification interrogator, and a display configured to indicate a system status and/or an event, wherein the system status and/or event includes at least one of an actuation of the doorbell actuator switch and the alarm event, and wherein the doorbell actuator switch, the identification interrogator, and the display are located in or on the doorbell module housing.

17. The security system of claim 14, further comprising a camera configured to acquire a still image and/or a video clip and communicate information associated with the still image and/or video clip to the at least one processor, wherein at least one of the one or more processors is configured to execute a video program component causing the at least one processor to facilitate receipt of the still image and/or video clip and generate video information associated with the still image and/or video clip.

18. The security system of claim 17, further comprising a server operatively linked to the security monitoring device, wherein the server is configured to:

receive and facilitate electronic storage of at least a part of the alarm information associated with an alarm event;

receive and facilitate electronic storage of at least part of the identification information associated with a person, an animal or an object;

receive and facilitate electronic storage of at least part of the video information associated with the still image and/or video clip; and facilitate transmission of at least part of the alarm information, at least part of the identification information, and at least part of the video information to the user device associated with the end user, the user device being configured to present the alarm information, the identification information, and/or the video information to the end user.

19. The security system of claim 17, further comprising a doorbell module including a doorbell module housing, the camera, the doorbell actuator switch, and the identification interrogator, wherein the camera, the doorbell actuator switch, and the identification interrogator are located in or on the doorbell module housing.

* * * * *